(12) United States Patent
Saka

(10) Patent No.: US 11,349,745 B2
(45) Date of Patent: May 31, 2022

(54) LATENCY MEASUREMENT TECHNIQUES IN A LOW LATENCY ENVIRONMENT

(71) Applicant: PayPal, Inc., San Jose, CA (US)

(72) Inventor: Veera Saka, Bangalore (IN)

(73) Assignee: PAYPAL, INC., San Jose, CA (US)

( * ) Notice: Subject to any disclaimer, the term of this patent is extended or adjusted under 35 U.S.C. 154(b) by 379 days.

(21) Appl. No.: 16/429,487

(22) Filed: Jun. 3, 2019

(65) Prior Publication Data

US 2020/0382400 A1     Dec. 3, 2020

(51) Int. Cl.
| | |
|---|---|
| *H04L 12/26* | (2006.01) |
| *G06F 12/02* | (2006.01) |
| *H04L 43/106* | (2022.01) |
| *H04L 43/08* | (2022.01) |
| *H04L 12/66* | (2006.01) |
| *G06Q 20/10* | (2012.01) |

(52) U.S. Cl.
CPC ........ *H04L 43/106* (2013.01); *G06F 12/0223* (2013.01); *G06Q 20/10* (2013.01); *H04L 12/66* (2013.01); *H04L 43/08* (2013.01); *G06F 2212/1044* (2013.01)

(58) Field of Classification Search
CPC ... H04L 43/0852; H04L 43/08; H04L 43/106; H04L 12/66
See application file for complete search history.

(56) References Cited

U.S. PATENT DOCUMENTS

| | | | |
|---|---|---|---|
| 2005/0088976 A1* | 4/2005 | Chafle | H04L 47/15 370/252 |
| 2013/0047155 A1* | 2/2013 | Caspole | G06F 9/445 718/1 |
| 2014/0297846 A1* | 10/2014 | Hoja | H04L 43/10 709/224 |
| 2016/0205174 A1* | 7/2016 | Pitio | G06Q 40/04 709/201 |
| 2016/0277272 A1* | 9/2016 | Peach | H04L 43/0858 |
| 2017/0085447 A1* | 3/2017 | Chen | H04L 43/024 |
| 2017/0346850 A1* | 11/2017 | Jin | H04L 63/08 |
| 2018/0107577 A1* | 4/2018 | Johnsson | G06F 11/3428 |
| 2018/0288190 A1* | 10/2018 | Lyons | G06F 8/75 |

* cited by examiner

*Primary Examiner* — Charles C Jiang
*Assistant Examiner* — Voster Preval
(74) *Attorney, Agent, or Firm* — Haynes and Boone, LLP

(57) ABSTRACT

Latency of a gateway system that connects to downstream services can be measured using an external computer system. The gateway may route component requests to various downstream services in order to service a main request, and be part of an overall service where low latency is important. It may be desirable for the gateway system to have as little added latency as possible. Benchmarking the gateway by performing latency measurements can give an indication of how the gateway is performing. If software on the gateway changes, re-benchmarking the gateway can reveal if problematic code was introduced. A measurement system can employ a lightweight process so that minimal additional latency is incurred by the measuring process. Memory can be allocated as to avoid a garbage collection process so that the latency measurement is unaffected when garbage collection occurs, for example, and multiple buffers can measure latency for different request types.

20 Claims, 4 Drawing Sheets

LATENCY MEASUREMENT TECHNIQUES IN A LOW LATENCY ENVIRONMENT

TECHNICAL FIELD

This disclosure relates to improvements in latency measurements, particularly in low latency environments where it may be important to avoid timing disruptions caused by the measurement process itself.

BACKGROUND

In a number of different computing environments, latency measurements may need to be taken. How long a server takes to respond to requests may be monitored for a variety of reasons, for example.

Processes used to measure latency, however, may introduce some latency themselves as they capture and record latency information. Applicant recognizes that there is room to improve latency measurement, particularly in environments where disruption caused by the latency measurement itself can adversely affect important metrics relevant to a service level agreement (SLA) or other policies and requirements.

DETAILED DESCRIPTION

Techniques are described relating to improvements for measuring latency of a computer system using an external computer system. More specifically, a gateway system may be measured by a measurement system, according to some embodiments.

The gateway system may route component requests to various downstream services, and be part of an overall service where low latency is important to achieve. Thus, it may be desirable for the gateway system to have as little additional latency as possible (as in various embodiments, the gateway system does not directly service requests itself, but acts as a middleman to other systems that ultimately perform the tasks needed to service a request). Benchmarking the gateway system by performing various latency measurements can thus give an overall indication of how fast or slow the gateway is performing. If the software on the gateway system changes, it may be desirable to re-benchmark the gateway. For example, if latency goes up 5%, 10%, 25% (or some other number) after a software change is made, this may indicate problematic code was introduced at the gateway, and such code might be re-examined to see if the code change can be fixed or rolled back.

The measurement system can employ a lightweight process to measure gateway system latency so that minimal additional latency is incurred in the measuring itself. In various embodiments, memory is allocated in a way such as to avoid a garbage collection process so that the latency measurement is unaffected when garbage collection occurs. Various additional aspects are discussed further below.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Figure 1:
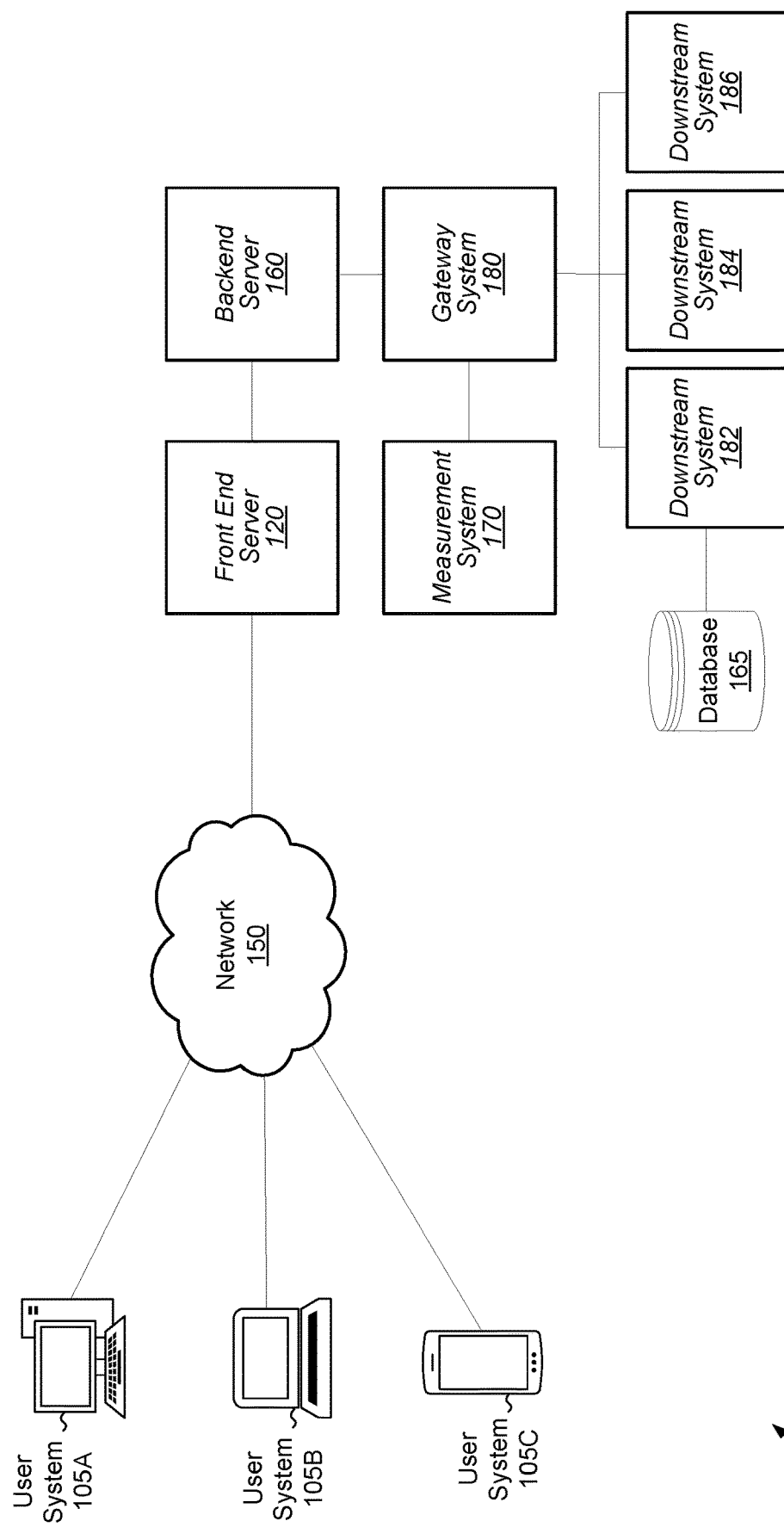
FIG. 1 illustrates a block diagram of a system including user systems, a front end server, backend server, measurement system, and gateway system, according to some embodiments.

Turning to FIG. 1, a block diagram of a system 100 is shown, according to various embodiments. In this diagram, system 100 includes user systems 105A, 105B, and 105C. System 100 also includes front end server 120, backend server 160, measurement system 170, gateway system 180, downstream systems 182, 184, and 186, database 165, and network 150. The techniques described herein can be utilized in the environment of system 100, as well as numerous other types of environment.

Note that many other permutations of FIG. 1 are contemplated (as with all figures). While certain connections are shown (e.g. data link connections) between different components, in various embodiments, additional connections and/or components may exist that are not depicted. As will be appreciated by one of skill in the art, various devices may be omitted from this diagram for simplicity—thus, in various embodiments, routers, switches, load balancers, computing clusters, additional databases, servers, and firewalls, etc., may all be present. Components may be combined with one other and/or separated into one or more systems in this figure, as in other figures.

User systems 105A, 105B, and 105C ("user systems 105") may be any user computer system that can potentially interact with front end server 120, according to various embodiments. Front end server 120 may provide web pages that facilitate one or more services, such as account access and electronic payment transactions (as may be provided by PayPal.com™). Front end server 120 may thus also facilitate access to various electronic resources, which can include an account, data, and various software programs/functionality, etc. Front end server 120 may thus be any computer system configured to provide access to electronic resources. This can include providing web content, in various embodiments, as well as access to functionality provided a web client (or via other protocols, including but not limited to SSH, FTP, database and/or API connections, etc.). Services provided may include serving web pages (e.g. in response to a HTTP request) and/or providing an interface to functionality provided by backend server 160 and/or database 165. Database 165 may include various data, such as user account data, system data, and any other information. Multiple such databases may exist, of course, in various embodiments, and can be spread across one or more data centers, cloud computing services, etc. Front end server 120 may comprise one or more computing devices each having a processor and a memory. Network 150 may comprise all or a portion of the Internet.

Front end server 120 may correspond to an electronic payment transaction service such as that provided by PayPal™ in some embodiments, though in other embodiments, front end server 120 may correspond to different services and functionality. Front end server 120 and/or backend server 160 may have a variety of associated user accounts allowing users to make payments electronically and to receive payments electronically. A user account may have a variety of associated funding mechanisms (e.g. a linked bank account, a credit card, etc.) and may also maintain a currency balance in the electronic payment account. A number of possible different funding sources can be used to provide a source of funds (credit, checking, balance, etc.). User devices (smart phones, laptops, desktops, embedded systems, wearable devices, etc.) can be used to access electronic payment accounts such as those provided by PayPal™. In various embodiments, quantities other than currency may be exchanged via front end server 120 and/or backend server 160, including but not limited to stocks, commodities, gift cards, incentive points (e.g. from airlines or hotels), etc. Server system 120 may also correspond to a system providing functionalities such as API access, a file server, or another type of service with user accounts in some embodiments (and such services can also be provided via front end server 120 in various embodiments).

Database 165 can include a transaction database having records related to various transactions taken by users of a transaction system in the embodiment shown. These records can include any number of details, such as any information related to a transaction or to an action taken by a user on a web page or an application installed on a computing device (e.g., the PayPal app on a smartphone). Many or all of the records in database 165 are transaction records including details of a user sending or receiving currency (or some other quantity, such as credit card award points, cryptocurrency, etc.). The database information may include two or more parties involved in an electronic payment transaction, date and time of transaction, amount of currency, whether the transaction is a recurring transaction, source of funds/ type of funding instrument, and any other details. Such information may be used for bookkeeping purposes as well as for risk assessment (e.g. fraud and risk determinations can be made using historical data; such determinations may be made using systems and risk models not depicted in FIG. 1 for purposes of simplicity). As will be appreciated, there may be more than simply one database in system 100. Additional databases can include many types of different data beyond transactional data. Any description herein relative to database 165 may thus be applied to other (non-pictured) databases as well.

Backend server 160 may be one or more computing devices each having a memory and processor that enable a variety of services. Backend server 160 may be deployed in various configurations. In some instances, all or a portion of the functionality for web services that is enabled by backend server 160 is accessible only via front end server 120 (e.g. some of the functionality provided by backend server 160 may not be publicly accessible via the Internet unless a user goes through front end server 120 or some other type of gateway system).

Measurement system 170 and gateway system 180 likewise may be one or more computing devices each having a memory and processor. In various embodiments, measurement system 170 performs operations related to measuring the latency of gateway system 180. Measurement system 170 may transmit modified service requests to gateway system 180, in some instances, and measure the latency for those requests to be answered.

Gateway system 180 is configured to receive a service request, in various embodiments, and route portions of that request to various downstream services that may be present on downstream systems 182, 184, and 186 (note that a greater or lesser number of such downstream systems may be present in various embodiments). As an example, a service request may be a transfer request for an electronic transfer of monetary funds from a user account A to a user account B. In this example, downstream system 182 might provide a risk processing service that evaluates the transfer request for fraud risk. Downstream system 184 might provide a funds availability service that evaluates whether sufficient funds exist for the transfer (e.g. by checking an account balance, a credit limit, etc.). Downstream system 186 meanwhile might provide a compliance service (e.g. verifying that applicable laws do not prohibit this particular transfer of monetary funds). Of course, different downstream systems may provide different services in a variety of embodiments.

Achieving low latency may be very important for gateway system 180, in various embodiments. In the case of transaction requests, gateway system 180 may be expected to meet service level agreements (SLAs) with high reliability—for example, gateway system 180 might be expected to return responses to 99.99% of requests within 250 milliseconds or less.

To determine latency, however, a measurement must be taken for gateway system 180. One problem with some techniques, however, is that the act of taking the latency measurement may itself introduce additional latency. In circumstances where unnecessary delays on the order of even fractions of a millisecond can affect results, it can be important to make the latency measurement process as efficient and quick as possible.

Note that downstream system 182 is shown as being connected to database 165 in this figure. Database 165 may also be connected to downstream system 184 and/or 186 in some cases. Further, downstream systems 182, 184, and 186 may be connected to one or more other databases (not shown). These databases may be utilized by the downstream systems to service components of an overall service request handled by gateway system 180.

Figure 2:
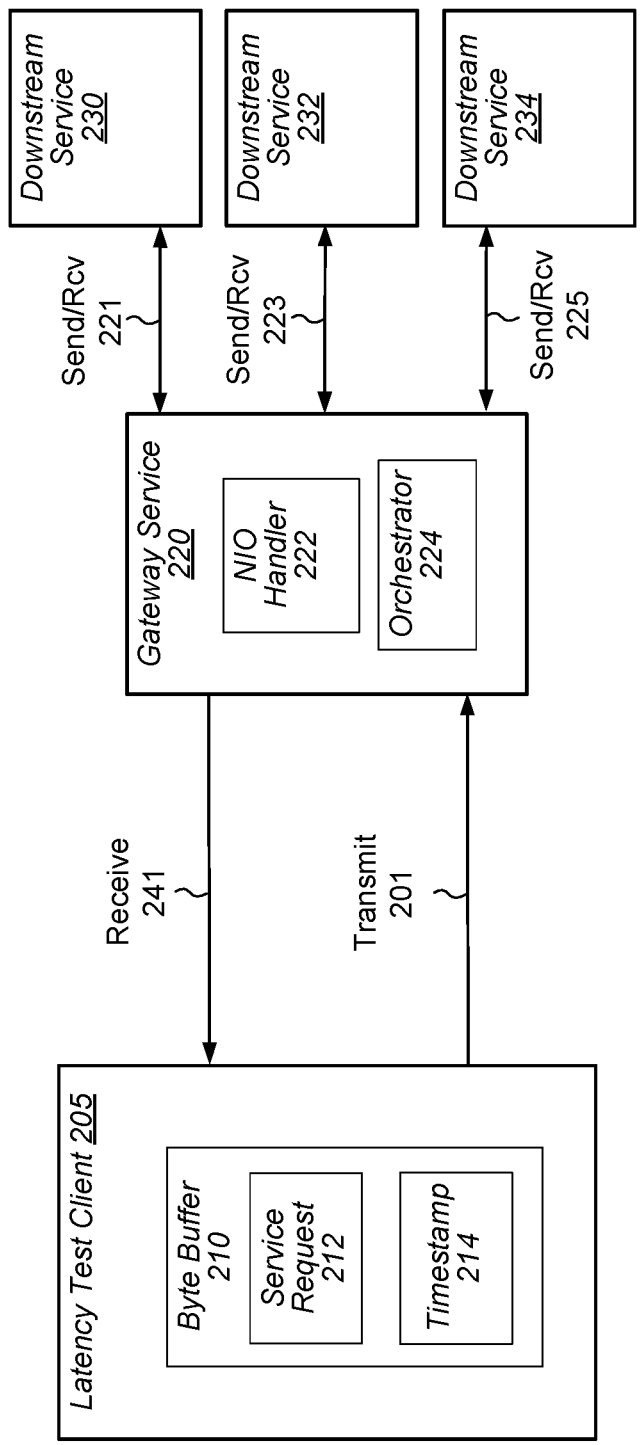
FIG. 2 illustrates a diagram relating to a flow of data related to latency measurement for a system such as a gateway system.

Turning to FIG. 2, a diagram is shown of a system 200 relating to a flow of data related to latency measurement for a system such as gateway system 180. Concepts discussed relative to this diagram will be explained in further detail relative to other diagrams (e.g. FIG. 3) further below.

In FIG. 2, latency test client 205 includes a byte buffer 210. Latency test client may comprise software executing on measurement system 170. Latency test client 205 may load service request 212 into byte buffer 210, and may also load timestamp 214 into the buffer (although in some embodiments this timestamp may be added prior to service request 212 being removed from the byte buffer). In operation 201, the service request and timestamp are transmitted to gateway service 220, which may be software executing on gateway system 180.

Gateway server 220 may use NIO handler 222 and orchestrator 224 to break the service request into component pieces, e.g., pieces to be serviced by different ones of downstream services 230, 232, and 234 (which may be software executing on downstream systems 182, 184, and/or 186). Operations 221, 223, and 225 include sending information (e.g. component service requests) to these downstream services and receiving information in reply (e.g. component service responses). The timestamp sent to gateway service 220 may be stored at gateway service 220 for later reporting back to latency test client 205, or may be transmitted along with component service requests and later received back with the component service responses (and can then be forwarded back to latency test client 205).

Figure 3:
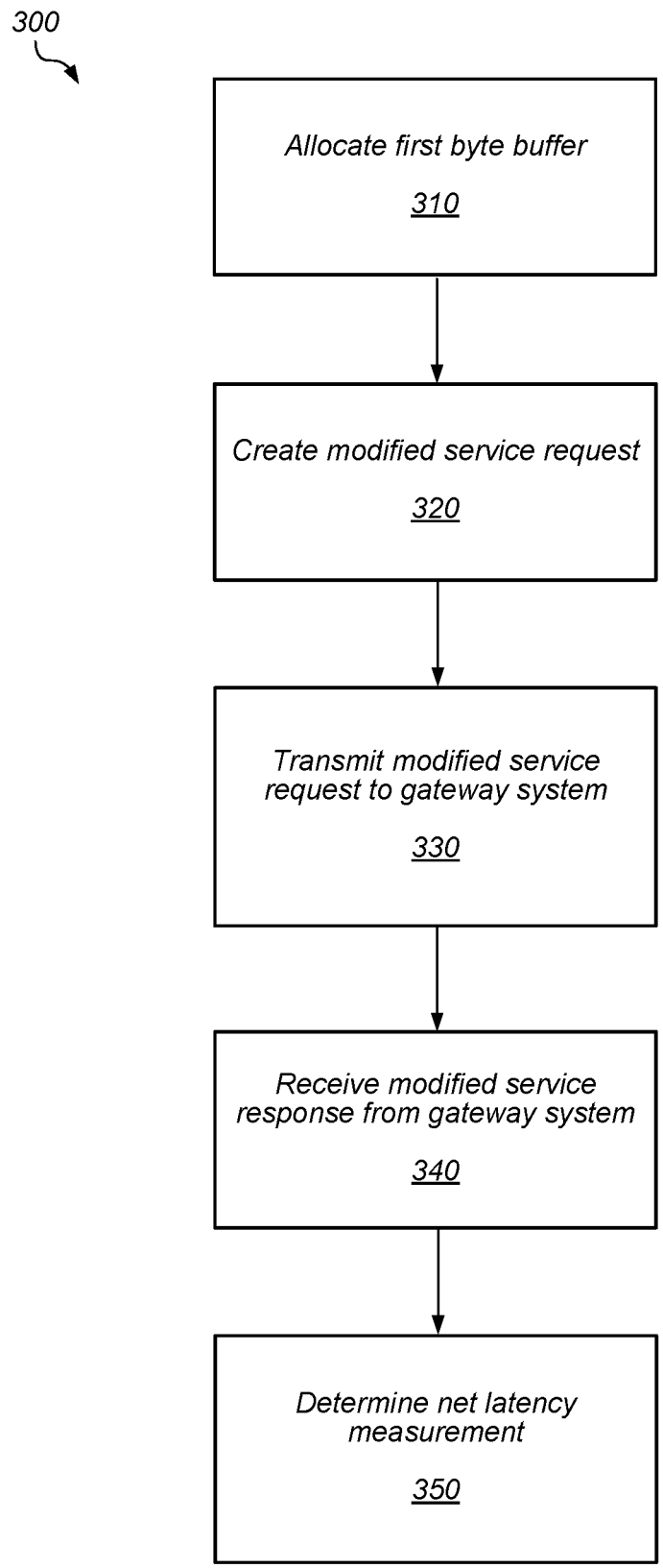
FIG. 3 illustrates a flowchart of a method relating to taking latency measurements with a minimal/low amount of latency being introduced by the measurement process itself, according to some embodiments.

Turning to FIG. 3, a flowchart is shown of a method 300 relating to taking latency measurements with a minimal/low amount of latency being introduced by the measurement process itself, according to various embodiments.

Operations described relative to FIG. 3 may be performed, in various embodiments, by any suitable computer system and/or combination of computer systems, including measurement system 170. For convenience and ease of explanation, operations described below will simply be discussed relative to measurement system 170 rather than any other system, however. Further, various operations and elements of operations discussed below may be modified, omitted, and/or used in a different manner or different order than that indicated. Thus, in some embodiments, measurement system 170 may perform one or more operations while another system might perform one or more other operations.

In operation 310, measurement system 170 allocates a first byte buffer in memory such that the first byte buffer is not subject to garbage collection by a memory management process, according to various embodiments.

One issue with latency measurement, particularly within the context of the architecture described in FIG. 1, is that garbage collection processes can impact the collection of latency metrics. If a JAVA™ program is being used for latency measurements for example, at some point a memory management process for the JAVA virtual machine may begin garbage collection, in which previously allocated memory may be freed by the memory manager and returned to a heap for future use. If this process occurs while a latency measurement is being taken, however, that measurement may experience a delay while the garbage collection process takes place. The true latency measurement of gateway system 180 servicing a request may be 225 milliseconds, for example, but garbage collection might cause this request to be measured at some greater value (e.g. 300 ms, 500 ms, or some other number). If an SLA requirement for the latency response is 250 ms, for example, this garbage collection delay would make it appear that the gateway system has violated the SLA, even if this is not really the case. Thus, it is desirable in various embodiments to streamline the measurement taking process to avoid this delay.

The first byte buffer can thus be directly allocated in memory rather than, e.g., instantiating an object that would later be deleted (and then have the memory that object used subjected to a garbage collection process). For example, the first byte buffer could be allocated directly in a language such as C++. Or the first byte buffer could be allocated within a JAVA thread such that the first byte buffer is part of an object that will never be deallocated (e.g. returned to the heap) during the time that latency measurements are taken—which may be a continuing and ongoing process. That is, latency measurements maybe taken at one or more intervals on a continuous basis in order to monitor the health and responsiveness of gateway system 180.

Accordingly, when the first byte buffer is not subject to garbage collection, this means in various embodiments that the memory used for the first byte buffer will not go through a garbage collection process while a program used to create the first byte buffer is executing (e.g. the memory will be allocated once and then remain in use while latency measurements are taking place, rather than have that memory de-allocated and re-used).

In operation 320, measurement system 170 creates a modified service request using the first byte buffer, according to various embodiments. This operation may include loading a first service request into the first byte buffer. This first service request can be loaded from local storage on measurement system 170 in some instances. Further, this first service request may be a predefined request—e.g., a particular request constructed or selected for purposes of benchmarking gateway system 180. Loading the first service request into the first byte buffer can thus comprises reading predetermined test data from storage into the first byte buffer (e.g. there may be a series of one or more test requests used for latency measurements).

This request may include a particular electronic transaction, and may include movement of funds from dummy accounts (such that actual user funds are unaffected by latency measurement testing). The requests themselves, however, may target data that is stored in actual production databases (e.g. dummy data may be stored in these databases alongside real world data in order to provide latency measurements). Note that latency measurement operations can include using a series of benchmark requests—for example, there may be a plurality of requests including the first service request that are used by measurement system 170 to benchmark performance of gateway system 180.

Operation 320 may also include, in association with the loading, adding a first timestamp to the modified service request. The timestamp includes a time value that will be used to later measure a service response from gateway system 180. This time value may highly precise and include an accuracy down to individual microseconds or even nanoseconds. The time value is local to measurement system 170 in various embodiments—that is, the reference time used to generate the time value is maintained by measurement system 170 in some embodiments.

The first timestamp can be added to the first byte buffer into order to create the modified service request. Thus, in some embodiments, the first byte buffer is large enough to accommodate all forms of service requests, as well as the maximum possible length for a time value. The first timestamp may be appended to the first service request, or prepended, or placed in any other suitable location relative to the first service request data. Additionally, the first timestamp can be added to the first service request outside of the first byte buffer, if desired, in some embodiments (e.g. another buffer could be used).

Adding the first timestamp to the modified service request is the last action taken regarding the modified service request prior to transmitting the modified service request to gateway system 180, in various embodiments. This is because the timestamp is used to measure latency, and it would be undesirable to create the timestamp and then take any other operations that could have occurred prior to creation of the timestamp. Thus, all contents of the first service request may be loaded into the first byte buffer prior to creating the first timestamp. When adding the first timestamp is the last action taken regarding the modified service request prior to transmitting, this means that no data in or associated with the modified service request is changed, logged, or copied before the transmitting operation begins (and after the modified service request is created), according to various embodiments. This is because it is not necessary to keep track locally of the timestamp, as it travels with the modified service request, according to various embodiments.

In operation 330, measurement system 170 transmits the modified service request, including the first service request and the first timestamp, to a gateway system configured to contact a plurality of downstream systems in response to the first service request, according to various embodiments. Thus, measurement system 170 may transmit the modified service request to gateway system 180.

The modified service request includes the first timestamp as this allows the first timestamp to "travel" with the request while it is being serviced by gateway system 180. There is no need to keep a log of the timestamp at measurement system 170 due to this architecture, according to various embodiments. This means that measurement system 170 has less execution overhead, as it does not have to keep track of the timestamp (e.g. maintain a log of all requests that were sent out, along with their respective timestamps, and then later reference this log when a response is received to determine the total latency for the request to be serviced). The timestamp in the modified service request is thus not logged at measurement system 170 prior to a modified service request being received.

Gateway system 180 is configured to contact downstream systems 182, 184, and/or 186 in various embodiments in order to service the first service request contained in the modified service request. As discussed above, for example, a first service request for an electronic currency transfer may have component portions that can be routed as separate component requests to different downstream services (such as a funds availability service, risk assessment service, etc.). The gateway system can then collect and bundle the responses from the downstream services. This prevents a requesting client from having to separately manage those individual responses, for example, and instead allows the gateway system to perform this function according to various embodiments.

The downstream systems 182, 184, and/or 186 may be live production systems that are actively in use to service real-world user requests. For example, these systems may be configured to service real-world requests for electronic currency transfers. Gateway benchmarking (see further below) can thus be performed relative to downstream systems that are not testing systems, but are in current use for a service.

In operation 340, measurement system 170 receives, from the gateway system, a modified service response to the modified service request, where the modified service request includes a respective component response from each of the plurality of downstream systems and includes the first timestamp, according to various embodiments.

The modified service response may thus include a first component response from a downstream service running on downstream system 182, a second component response from another downstream service running on downstream system 184, etc. The first timestamp is included in the modified service response as well, as it allows measurement system 170 to calculate a latency measurement for the time it took gateway system 180 to responds to the modified service request that was previously sent to it.

In some embodiments, as soon as the modified service response is received, measurement system 170 generates a second timestamp and extracts the first timestamp from the modified service response. In some instances, the second timestamp is generated prior to extracting the first timestamp in order to minimize an amount of external latency introduced into the measurement process—e.g., generate the second timestamp as soon as possible, then extract the first timestamp in order to calculate the latency measurement that represents a total amount of time it took for gateway system 180 to handle the modified service request.

In operation 350, measurement system 170 determines a net latency measurement for the gateway system by measuring a difference between the first timestamp and a second timestamp corresponding to a time at which the modified service response was received, according to various embodiments. A time value in the first timestamp can be subtracted from a time value in the second timestamp in order to calculate the latency—e.g., this may result in a determination that a latency measurement for the gateway for this particular response was 189 milliseconds, 534 microseconds, and 12 nanoseconds. The second time value in the second timestamp may thus be in the same format and level of precision as the first time value in the first timestamp. Note that in various embodiments the first time value in the first timestamp is not modified by gateway system 180, and thus the time value in this timestamp is the same when it is sent out (in the modified service request) and when it is received again (in the modified service response).

Note that there may be several distinct types of service requests for which latency is measured, in various embodiments. These service requests may have varying data types and/or parameters associated with them. Thus, the first byte buffer may be created for a first type of service request, and all latency measurements for that type of service request may utilized that first byte buffer.

Likewise, additional (second, third, etc.) byte buffers may be utilized in a similar manner to test latency for additional types of service requests. Accordingly, measurement system 170 may allocate second and third byte buffers in memory such that the second and third byte buffers are not subject to garbage collection by the memory management process, and these second and third byte buffers may be respectively created for different second and third types of service requests. These second and third byte buffers are usable in some embodiments to create additional modified service requests to measure net latency of the gateway system for the second and third types of service requests. Latency measurements may be performed the same as with the first byte buffer—all techniques described above for the first byte buffer are likewise applicable in various embodiments.

Changing software versions for gateway system 180 is an important trigger for testing latency of service requests, in some embodiments. When overall latency for a service request is desired to be as low as feasibly possible, having gateway system 180 introduce minimal additional latency is helpful (as downstream systems may have their own considerable latencies).

By testing latency of one or more types of service requests, gateway system 180 can be initially benchmarked. As new versions of software running on gateway system 180 are introduced and changes are made, latency of that system may change as well. It is useful to know whether such changes have significantly impacted gateway system 180's latency, and thus when a software change occurs an additional benchmarking process can occur. The benchmarking can test one or multiple types of service requests. Overall latency can be calculated (e.g. as an average across multiple tests), as well as latency for particular types of service requests.

Consider a version 1.0 of software on gateway system 180 that has a general average overall latency, and particular average latencies for service request types #1, #2, and #3. When version 1.1 of that software is introduced, re-benchmarking gateway system 180 can help verify whether any deleterious effects were introduced. It may be the case that overall average latency goes up 2% or 3%, or down 5%, when a change is made. This may not be considered consequential. If overall average latency goes up by 40%, however, then there may be problematic and/or buggy code that was introduced in the version change—and this may prompt a software developer to roll back the recent change or to investigate a way to fix the problem. Likewise, a change in software on gateway system 180 might impact only a particular service request type—e.g. service request types #1 and #2 may have average latencies that are fairly similar to previous versions of the software, but service request type #3 had an increased latency of 20%. Thus, it can be useful to track latency measurements for particular service request types since a change in code could affect one of those types but not others (and if there are many types of service requests, a large latency increase in one type might not cause a large latency increase in the overall overall latency for all types of requests). Latency can thus be tested a first software version of the gateway system using first, second, and third byte buffers for first, second, and third types of service requests in some embodiments (e.g. taking an overall overage and/or service request type averages). Responsive to a newer software version being installed on the gateway system, latency of the newer software version of the gateway system can also be tested using the first, second, and third byte buffers for the first, second, and third types of service requests.

Computer-Readable Medium

Figure 4:
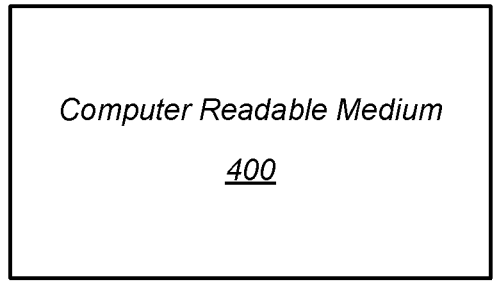
FIG. 4 is a diagram of a computer readable medium, according to some embodiments.

Turning to FIG. 4 a block diagram of one embodiment of a computer-readable medium 400 is shown. This computer-readable medium may store instructions corresponding to the operations of FIG. 3 and/or any techniques described herein. Thus, in one embodiment, instructions corresponding to measurement system 170 may be stored on computer-readable medium 400.

Note that more generally, program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as Perl. Note that as used herein, the term "computer-readable medium" refers to a non-transitory computer readable medium.

Computer System

Figure 5:
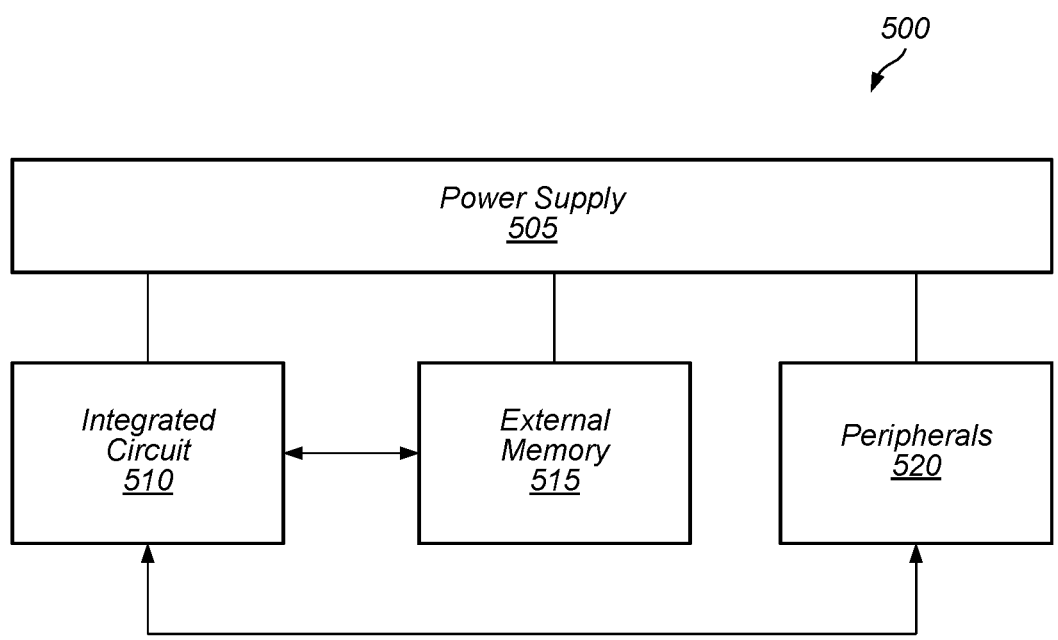
FIG. 5 is a block diagram of a system, according to some embodiments.

In FIG. 5, one embodiment of a computer system 500 is illustrated. Various embodiments of this system may be included in front end server 120, backend server 160, measurement system 170, gateway system 180, or any other computer system.

In the illustrated embodiment, system 500 includes at least one instance of an integrated circuit (processor) 510 coupled to an external memory 515. The external memory 515 may form a main memory subsystem in one embodiment. The integrated circuit 510 is coupled to one or more peripherals 520 and the external memory 515. A power supply 505 is also provided which supplies one or more supply voltages to the integrated circuit 510 as well as one or more supply voltages to the memory 515 and/or the peripherals 520. In some embodiments, more than one instance of the integrated circuit 510 may be included (and more than one external memory 515 may be included as well).

The memory 515 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 510 in a chip-on-chip configuration, a package-on-package configuration, or a multi-chip module configuration.

The peripherals 520 may include any desired circuitry, depending on the type of system 500. For example, in one embodiment, the system 500 may be a mobile device (e.g. personal digital assistant (PDA), smart phone, etc.) and the peripherals 520 may include devices for various types of wireless communication, such as Wi-fi, Bluetooth, cellular, global positioning system, etc. Peripherals 520 may include one or more network access cards. The peripherals 520 may also include additional storage, including RAM storage, solid state storage, or disk storage. The peripherals 520 may include user interface devices such as a display screen, including touch display screens or multitouch display screens, keyboard or other input devices, microphones, speakers, etc. In other embodiments, the system 500 may be any type of computing system (e.g. desktop personal computer, server, laptop, workstation, net top etc.). Peripherals 520 may thus include any networking or communication devices. By way of further explanation, in some embodiments system 500 may include multiple computers or computing nodes that are configured to communicate together (e.g. computing cluster, server pool, cloud computing system, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system related to latency measurements, comprising:
a processor; and
a memory having stored thereon instructions that are executable to cause the system to perform operations comprising:
allocating a first byte buffer that is dedicated for storing testing service requests for latency measurements without being de-allocated or re-used in the memory of the system, wherein the first byte buffer is not subject to garbage collection by a memory management process;
creating a modified service request using the first byte buffer, comprising:
loading a first service request comprising pre-determined test data relating to an electronic transaction into the first byte buffer; and
in association with the loading, adding a first timestamp to the modified service request;
transmitting the modified service request, including the first service request and the first timestamp, to a gateway system configured to contact a plurality of downstream systems in response to the first service request;
receiving, from the gateway system, a modified service response to the modified service request, wherein the modified service request includes a respective component response from each of the plurality of downstream systems and includes the first timestamp; and
determining a net latency measurement for the gateway system by measuring a difference between the first timestamp and a second timestamp corresponding to a time at which the modified service response was received.

2. The system of claim 1, wherein the first timestamp is added to the first byte buffer to create the modified service request.

3. The system of claim 1, wherein a time value in the first timestamp is not modified by the gateway system and the time value is the same in both the modified service request and the modified service response.

4. The system of claim 1, wherein adding the first timestamp to the modified service request is the last action taken regarding the modified service request prior to the transmitting.

5. The system of claim 1, wherein the first timestamp includes a time value that measures nanoseconds.

6. The system of claim 1, wherein the memory management process comprises a Java virtual machine.

7. The system of claim 1, wherein the first timestamp includes a time value that corresponds to local time of the system.

8. The system of claim 1, wherein the first timestamp is added to the modified service request after the first service request is read from the first byte buffer to create the modified service request.

9. The system of claim 1, wherein the first timestamp is not logged at the system prior to receiving the modified service response.

10. A method, comprising:
allocating a first byte buffer that is dedicated for storing testing service requests for latency measurements without being de-allocated or re-used in the memory of the system, wherein the first byte buffer is not subject to garbage collection by a memory management process;
creating a modified service request using the first byte buffer, comprising:
loading a first service request comprising pre-determined test data relating to an electronic transaction into the first byte buffer; and
adding a first timestamp to the first byte buffer;
transmitting the modified service request, including the first service request and the first timestamp, to a gateway system configured to contact a plurality of downstream systems in response to the first service request;
receiving, at the measurement computer system from the gateway system, a modified service response to the modified service request, wherein the modified service request includes a respective component response from each of the plurality of downstream systems and includes the first timestamp; and
determining a net latency measurement for the gateway system by measuring a difference between the first timestamp and a second timestamp corresponding to a time at which the modified service response was received.

11. The method of claim 10, wherein the first byte buffer is created for a first type of service request.

12. The method of claim 11, further comprising allocating second and third byte buffers in memory of the measurement computer system such that the second and third byte buffers are not subject to garbage collection by the memory management process;
wherein the second and third byte buffers are respectively created for different second and third types of service requests; and
wherein the second and third byte buffers are usable to create additional modified service requests to measure net latency of the gateway system for the second and third types of service requests.

13. The method of claim 12, further comprising:
testing latency of a first software version of the gateway system using the first, second, and third byte buffers for the first, second, and third types of service requests; and
responsive to a newer software version being installed on the gateway system, testing latency of the newer software version of the gateway system using the first, second, and third byte buffers for the first, second, and third types of service requests.

14. The method of claim 10, wherein loading the first service request into the first byte buffer comprises reading predetermined test data from storage into the first byte buffer.

15. The method of claim 10, wherein the plurality of downstream systems are configured to service real-world requests for electronic currency transfers.

16. The method of claim 10, wherein no data in or associated with the modified service request is changed, logged, or copied subsequent to creating the modified service request and before transmitting the modified service request.

17. A non-transitory computer-readable medium having stored thereon instructions that when executed by a computer system cause the computer system to perform operations comprising:
allocating a first byte buffer that is dedicated for storing testing service requests for latency measurements without being de-allocated or re-used in the memory of the system, wherein the first byte buffer is not subject to garbage collection by a memory management process;

creating a modified service request using the first byte buffer, comprising:

loading a first service request comprising pre-determined test data relating to an electronic transaction into the first byte buffer; and in association with the loading, adding a first timestamp to the modified service request;

transmitting the modified service request, including the first service request and the first timestamp, to a gateway system configured to contact a plurality of downstream systems in response to the first service request;

receiving, from the gateway system, a modified service response to the modified service request, wherein the modified service request includes a respective component response from each of the plurality of downstream systems and includes the first timestamp; and determining a net latency measurement for the gateway system by measuring a difference between the first timestamp and a second timestamp corresponding to a time at which the modified service response was received.

18. The non-transitory computer-readable medium of claim 17, wherein the first timestamp is added to the first byte buffer to create the modified service request.

19. The non-transitory computer-readable medium of claim 17, wherein a time value in the first timestamp is not modified by the gateway system and the time value is the same in both the modified service request and the modified service response.

20. The non-transitory computer-readable medium of claim 17, wherein the first service request comprises a request for an electronic transfer of funds.

* * * * *